UNITED STATES PATENT OFFICE.

EDWIN EUSTON, OF ST. LOUIS, MISSOURI.

COMPOSITION OF MATTER TO BE USED AS A PIGMENT.

1,108,562. Specification of Letters Patent. Patented Aug. 25, 1914.

No Drawing. Application filed June 27, 1913. Serial No. 776,013.

*To all whom it may concern:*

Be it known that I, EDWIN EUSTON, a citizen of the United States, residing at the city of St. Louis, State of Missouri, have invented a certain new and useful Improvement in a Composition of Matter to be Used as a Pigment, of which the following is a full, clear, and exact description.

My invention relates to a new and useful composition of matter to be used as a pigment, which can be produced by a simple and comparatively easily practised method.

This composition of matter consists of basic zinc carbonate and lead hydroxid, in intimate molecular combination.

It has long been recognized that the peculiarly smooth brushing quality of white lead, a quality not equaled by any other heretofore known pigment, is due to the combined lead hydroxid. It has also been recognized, that for a great many purposes, even a mechanical mixture of lead and zinc pigments gives much better results than either of the two pigments used singly. I have discovered that an intimately, molecularly combined pigment consisting essentially of basic zinc carbonate and lead hydroxid can be made, having the smooth brushing quality due to lead hydroxid, (heretofore associated only with white lead) and possessing in greatly enhanced degree the merits due to the joint use of zinc and lead when merely mechanically mixed. The composition of this new basic zinc carbonate-lead hydroxid compound can be varied, but one good proportion has the formula:—

$$ZnCO_3.Zn(OH)_2.Pb(OH)_2.$$

In making this new and valuable pigment, I prefer to prepare a moderately strong solution of zinc sulfate in water, although other soluble salts of zinc will serve, and to mix therewith, in a suitable vessel, a solution of a soluble carbonate, preferably of ammonium, to precipitate basic zinc carbonate. I then separate the precipitate from the liquid by decantation or other suitable means, and either before or after drying, treat the precipitate with basic lead acetate solution, preferably of about 20 degrees Baumé test, and preferably containing lead hydroxid in excess of the actual amount it is desired to combine with the basic zinc carbonate precipitate.

The relative amounts of basic zinc carbonate and of basic lead acetate solution used, vary according to the composition of each and with the degree of combination desired, twelve (12) to fifteen (15) pounds of 20 degree Baumé basic lead acetate solution usually being sufficient for every pound of basic zinc carbonate treated. The progress of the treatment may conveniently be watched by the reduction in specific gravity of the solution. According to the efficiency of the apparatus used, the treatment may require only a few minutes, or some hours. Stirring during the treatment is usually not necessary, unless the basic zinc carbonate has been dried prior to this treatment. Lead hydroxid, by this treatment, comes out of solution and combines intimately with the basic zinc carbonate to form the new and valuable pigment containing both lead hydroxid and basic zinc carbonate in the single molecule.

I do not limit myself to any special process, nor to any special means or ways of carrying out any process, as these are not essential to the broad idea of my invention, which consists in making, by any suitable means whatsoever, the new and valuable pigment composed of basic zinc carbonate and lead hydroxid intimately and molecularly combined.

I claim:

The hereindescribed composition of matter to be used as a pigment, consisting of basic zinc carbonate and lead hydroxid in intimate molecular combination.

In testimony whereof I hereunto affix my signature in the presence of two witnesses, this 24th day of June, 1913.

EDWIN EUSTON.

Witnesses:
M. P. SMITH,
M. A. HANDEL.